(12) United States Patent
Reik et al.

(10) Patent No.: US 6,494,303 B1
(45) Date of Patent: Dec. 17, 2002

(54) TORSIONAL VIBRATION DAMPER FOR A TORQUE TRANSMITTING APPARATUS

(75) Inventors: Wolfgang Reik, Bühl (DE); Edmund Maucher, Wooster, OH (US); Shailesh Kozarekar, Farmington Hills, MI (US); William Brees, Wooster, OH (US)

(73) Assignees: Luk Lamellen und Kuplungsbau GmbH, Buhl (DE); Luk Lamellen und Kupplungsbau Beteilligungs KG, Buhl (DE)

( * ) Notice: Subject to any disclaimer, the term of this patent is extended or adjusted under 35 U.S.C. 154(b) by 0 days.

(21) Appl. No.: 09/574,477

(22) Filed: May 19, 2000

(30) Foreign Application Priority Data

May 21, 1999 (DE) .......................................... 199 23 561

(51) Int. Cl.$^7$ .............................................. F16H 45/02
(52) U.S. Cl. ...................................... 192/3.29; 192/212
(58) Field of Search .............................. 192/3.28, 3.29, 192/212

(56) References Cited

U.S. PATENT DOCUMENTS

| | | | | | |
|---|---|---|---|---|---|
| 4,966,261 | A | * | 10/1990 | Kohno et al. | 192/3.29 |
| 5,121,821 | A | * | 6/1992 | Poorman et al. | 192/3.28 |
| 5,203,835 | A | * | 4/1993 | Kohno et al. | 192/3.29 |
| 6,112,869 | A | * | 9/2000 | Krause et al. | 192/3.29 |

* cited by examiner

Primary Examiner—Saul Rodriguez
(74) Attorney, Agent, or Firm—Alfred J. Mangels (57) ABSTRACT

A torque transmitting system including a torque converter or a fluid coupling. The system includes a torsional-vibration damper that is positioned within the housing of the fluid coupling and that serves to damp torsional vibrations. Several locations at which the torsional-vibration damper can be positioned are disclosed.

24 Claims, 8 Drawing Sheets

TORSIONAL VIBRATION DAMPER FOR A TORQUE TRANSMITTING APPARATUS

BACKGROUND OF THE INVENTION

1. Field of the Invention

The present invention relates to a torque transmitting apparatus, and more particularly to a torque transmitting apparatus for a motor vehicle, wherein the apparatus includes a fluid coupling, such as a Föttinger clutch or a torque converter.

2. Description of the Related Art

Fluid couplings for motor vehicles include at least one pump impeller non-rotatably affixed to a drive shaft of a drive unit, at least one turbine wheel non-rotatably affixed to the input shaft of a power train to be driven, as well as, if necessary, at least one stator arranged between the impeller and the turbine, at least one housing receiving the impeller and the turbine, and at least one active torsional-vibration damper mounted between the drive shaft and the input shaft.

Such torque transmitting systems are especially known for use with multi-speed automatic transmissions, and a purpose of the present invention is to improve such systems, in particular their vibration damping effectiveness. Moreover, an improved damping design should be simpler and less costly to manufacture. The implementation of the control elements should be simple and compatible with the torque transmitting systems of the state of the art.

SUMMARY OF THE INVENTION

This problem is solved in a torque transmitting apparatus in accordance with the present invention, in particular one for a motor vehicle that includes a fluid coupling, such as a Föttinger clutch or a torque converter. The apparatus includes at least one impeller non-rotatably affixed to a drive shaft of a drive unit, at least one turbine non-rotatably affixed to an input shaft of a power train to be driven, as well as at least one stator mounted between the impeller and the turbine. The apparatus also includes at least one housing receiving the impeller and the turbine, and at least one active torsional-vibration damper mounted between the drive shaft and the input shaft, wherein the at least one torsional-vibration damper is arranged in the path of the flow of power between the drive shaft and the impeller.

In this torque transmitting apparatus the impeller can be rotatable relative to the housing.

In this torque transmitting apparatus the torsional-vibration damper can be arranged in the path of the flow of power and between the housing and the impeller.

In this torque transmitting apparatus the torsional-vibration damper can be mounted inside the housing.

In this torque transmitting apparatus the torsional-vibration damper can be mounted axially between the turbine and a housing wall facing the drive unit.

Moreover the torque transmitting apparatus of the invention allows mounting the torsional-vibration damper directly radially within an external periphery of the housing, and a controllable lockup clutch can be operational between the impeller and the housing or between a shell of the impeller and the housing. Further, the lockup clutch can be in the form of a piston non-rotatably supported on the housing but being axially displaceable, the piston being capable of frictionally engaging a component of the impeller.

In this torque transmitting apparatus a controllable lockup clutch can be mounted between the housing and the input shaft. When the lockup clutch is locked, at least one torsional-vibration damper can also be operative between the housing and the input shaft.

In the torque transmission system in accordance with the invention, the input element of the torsional-vibration damper can be joined directly to the housing or be integral with it. The output element of the torsional-vibration damper can be in the form of a flange that includes a frictional engagement surface for the plunger of the lockup clutch. The inner circumference of the flange can be radially beaded outward in order to provide a conical frictional engagement surface.

In a further embodiment of the invention, the output element of the torsional-vibration damper can be provided directly as an axial attachment to the impeller, preferably at its outer periphery. Furthermore, an annular flange to frictionally engage the plunger of the lockup clutch can be provided radially inward on the attachment. Additionally, the annular flange can be conical and can be arranged to face inwardly.

In accordance with the invention, frictional coatings can be arranged on the plunger or on the surface of the plunger that contacts the housing to provide the frictional engagement function.

To improve vibration behavior, the housing can be in the form of a primary inertial weight that is rotatable relative to a secondary inertial weight associated with the impeller to oppose the effect of the torsional-vibration damper. The secondary inertial weight can be supplemented by at least the mass of the turbine when the lockup clutch is engaged.

The at least one torsional-vibration damper can include circumferentially-distributed energy accumulator, which are effective at least in the circumferential direction and which can be in the form of short compression coil springs, and which preferably are mounted radially inside the largest axial dimension of the turbine. Alternatively, they can preferably be formed of pre-bent coil springs mounted adjacent the circumference of the assembly and, regarding their length as compared with the radius of the circumference of the assembly, they run over a comparable or larger arc of a circle and are mounted radially outside the largest axial turbine dimension, preferably directly inside the outer periphery of the housing.

BRIEF DESCRIPTION OF THE DRAWINGS

The invention is further illustrated in the partial sections of FIGS. 1 through 6, which show illustrative embodiments of a torque transmitting apparatus in accordance with the present invention.

DESCRIPTION OF THE PREFERRED EMBODIMENTS

Figure 1:
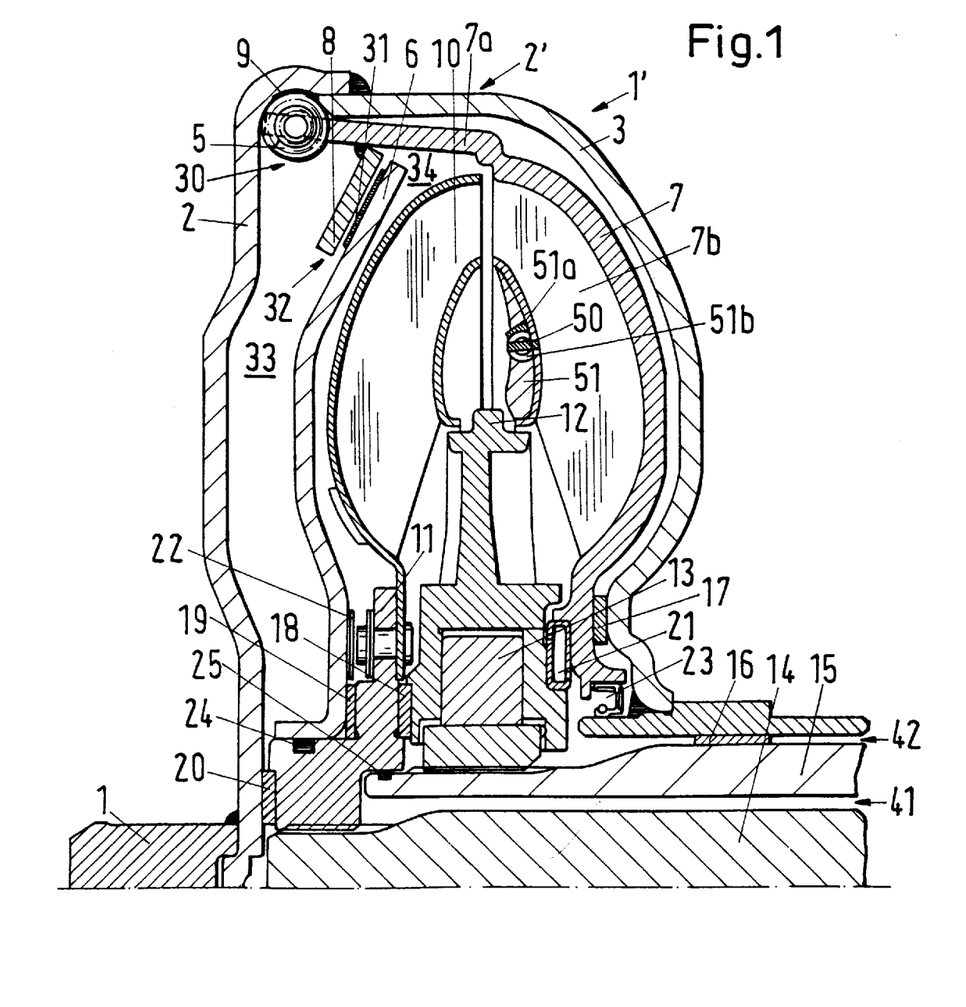
FIG. 1 is a partial sectional view of a torque transmitting apparatus in accordance with the present invention.

FIG. 1 shows torque-transmitting apparatus 1' that includes a housing 2' having a shell 2 that faces a drive unit (not shown). Housing 2' is connected to the drive shaft of the drive unit by a known drive plate (not shown) that extends preferably radially outwardly of the drive shaft of, for example, an internal-combustion engine, and that further includes a shell 3 that faces away from the drive unit. The two shells 2, 3 are tightly joined to each other at their outer peripheries, for example by welding, and are mounted on bearings by means of an axially-extending journal 1, which can be welded or otherwise joined with a corresponding structure that is centrally arranged relative to the crankshaft and rotatably supported by a transmission stub 15 extending from the transmission housing by means of an annular slide bearing 16.

Impeller 7, turbine 10 and stator 12, as well as piston 6 and torsional-vibration damper 30, are received within housing 2'. Stator 12 is mounted on a freewheel 13, or one-way clutch, in such a way as to be non-rotatable relative to transmission stub 15 in one direction and freely rotatable relative thereto in the other direction. Impeller 7 is rotatably supported by means of a bearing 21 on an axially-extending shoulder of stator 12 and is axially spaced from housing 2' by stop ring 17.

Turbine 10 is rotationally locked with hub flange 11 that meshes with transmission input shaft 14 and that is rotatably locked with it and is axially displaceable therealong. A sealing ring 25 is positioned between hub flange 11 and transmission stub 15, and hub flange 11 is axially spaced from stator 12 and from shell 2 by stop rings 18 and 20, respectively. A piston 6 is axially displaceably received on an axially-extending shoulder of hub flange 11, on the side of hub flange 11 that faces shell 2, and is sealing engaged with the hub flange by means of a sealing ring 24. Piston 6 is rotationally locked with and axially yieldably connected with hub flange 11 by means of leaf springs 22 that transfer from piston 6 to hub flange 11 a circumferentially-directed force. Piston 6 carries a friction lining 31 on its radial outer surface, that upon an axial displacement of piston 6 frictionally engages with an annular flange 8 that is securely connected with an axial extension 7a of impeller 7, such as by welding.

As shown in this embodiment, annular flange 8 can be positioned at an angle relative to axis of rotation of apparatus 1', so that in conjunction with the correspondingly-formed piston 6, it defines a conical torque converter lockup clutch 32. Torque converter lockup clutch 32 directs the torque introduced by the drive unit into the housing 2' directly through piston 6 and leaf springs 22 in hub flange 11, and then into gearbox input shaft 14, and thereby locks up the transmission path from housing 2' through torsional-vibration damper 30 on impeller 7 and from there through turbine 10 and hub flange 11 into gearbox input shaft 14.

Torsional-vibration damper 30 is mounted directly to the inside of the outer periphery of housing shell 2, and is formed from two preferably nested coil springs 5, preferably two closely spaced coil springs 5, that extend over half the circumference, each constituting a circumferentially effective energy accumulator. Energy accumulator 5 are connected at one curved end by connection apparatus (not shown) either connected to shell 2 or a part of it, and at the other end by the axial extension connected with impeller 7, so that energy accumulator 5 is acted on by centrifugal force to radially rest against an anti-wear lining 9 in order to constitute a torsional-vibration damper 30 of typical and known properties. As a result, torsional-vibration damper 30 is effective for power flows both when the converter lockup clutch 32 is open and when it is closed.

The configuration of torsional-vibration damper 30 in accordance with the present invention offers the advantage of a two-mass, swing-weight effect, in which a primary swing weight is constituted by housing 2' and a secondary swing weight is in that case constituted by impeller 7 when converter lockup clutch 32 is open. The effect of the two-mass inertial weight is even more pronounced when converter lockup clutch 32 is closed because the mass, that is the mass moment of inertia, of turbine 10 will also be connected.

An additional advantage of the present invention derives from an inertial mass 51 provided on the inside of impeller blades 7b, which can be advantageous in any embodiment of a torque transfer apparatus, such as torque converters or fluid couplings. The inertial mass 51 can be affixed directly to impeller blades 7b. Moreover, inertial mass 51 can be in the form of segments mounted in a circumferentially distributed manner on a plurality, preferably all, of blades 7b, to increase the moment of inertia of impeller 7 and thereby to positively influence the effects of vibrations, for example torsional vibrations. An especially advantageous arrangement of an inertial mass to provide a damping effect is shown, wherein inertial mass 51 has a torsional effect opposite to the action of circumferentially active energy accumulator 50, relative to the connection arrangement 51b for fastening inertial or damping mass 51 to the impeller, and hence is rotatable opposite to impeller 7. Energy accumulator 50 is thereby loaded oppositely to its operational direction on one side of connection arrangement 51a of damping mass 51, and is connected with the impeller by connection arrangement 51b. It is to be understood that such a design of inertial or damping masses can be advantageous for all converters and fluid couplings.

Converter lockup clutch 32 is controlled by the pressure of a pressurized medium within conduits 41, 42, wherein piston 6 is axially shifted as a function of that pressure, and in that case it contacts annular flange 8 to produce frictional engagement. For that purpose two chambers 33, 34 are provided in arrangement 1, and they are pressurized with a pressurized medium that is supplied through conduits 41, 42. Depending on the desired coupling condition, one of conduits 41, 42 is pressurized while the other acts as a discharge conduit for the pressurized medium, which preferably is ATF. When converter lockup clutch 32 is released, the pressurized medium in conduit 41 passes into chamber 33 and from there through chamber 34 to discharge conduit 42. To engage converter lockup clutch 32, the flow of pressurized medium is reversed and passes through conduit 42 into chamber 34. The excess pressure that builds up relative to chamber 33 causes piston 6 to be shifted axially and to be pressed against annular flange 8 to provide frictional engagement. The pressurized medium enters cooling channels in friction linings 31, and, if necessary, passes through any openings in the torsional-vibration damper that connect chambers 33, 34, and is evacuated through conduit 41. Stop rings 16, 20 include channels or are made porous to allow the pressurized medium to flow therethrough.

Figure 2:
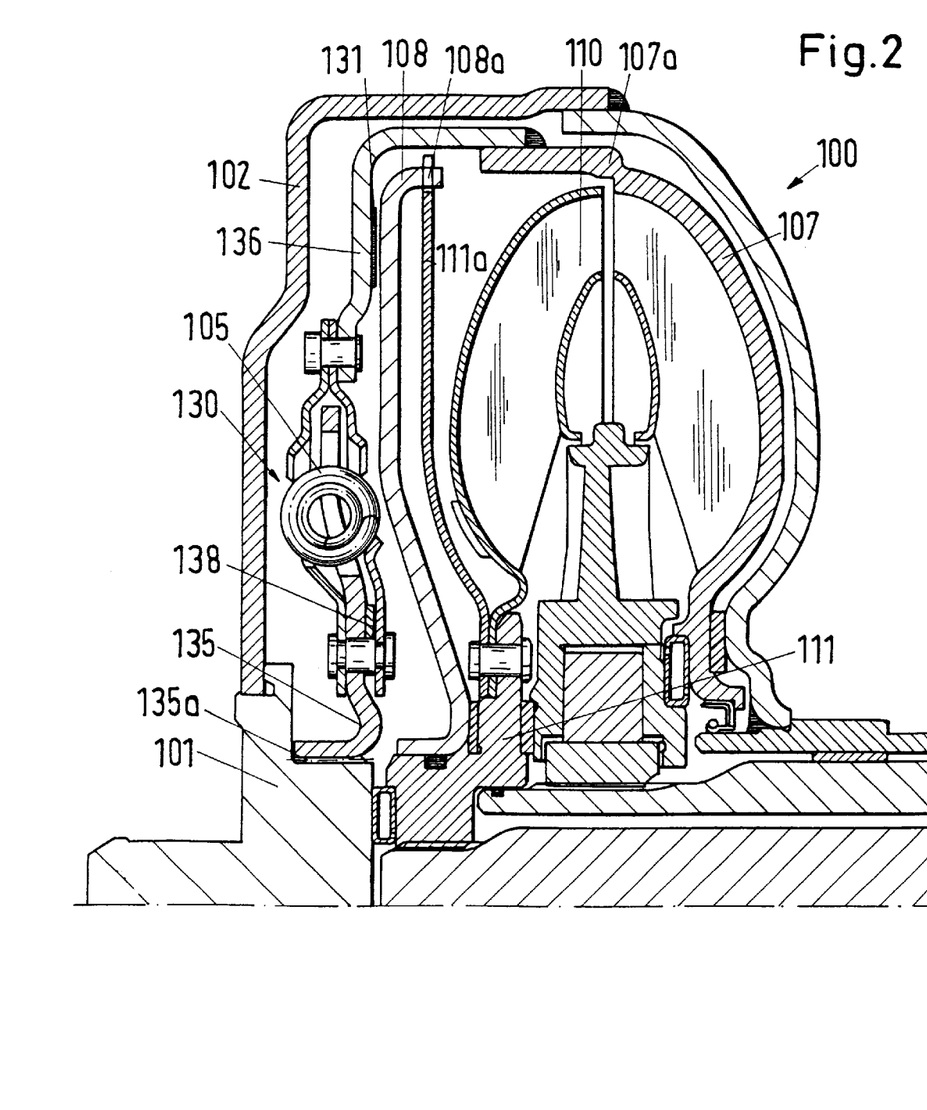
FIG. 2 is a partial sectional view similar to that of FIG. 1 showing an alternative embodiment of the present invention.

FIG. 2 shows an embodiment of an arrangement 100 corresponding in design and operation with the embodiment of arrangement 1' of FIG. 1, except for the differences described below:

Torsional-vibration damper 130 is disposed radially within the largest axial extension of turbine 110 and includes a plurality, preferably from 4 to 10, circumferentially distributed, short, energy accumulator, such as compression coil springs 105. The input element of damper 130 is rotatably locked with hub 101 that is connected with housing shell 102 by means of a flange element 135 having teeth 135a, while output element 102, which is formed from a flange element 136 that at its circumference is formed as an axial attachment and is non-rotatably connected with axial attachment 107a of impeller 107, such as by welding.

Piston 108 is axially movable through a spur gear 108a which is rotationally locked in a flange element 111a that is firmly affixed to hub flange 111, so that when the converter lockup clutch is locked, piston 108 transmits to hub flange 111, by means of flange element 111a, the torque introduced through the housing. In this embodiment, friction lining 131 is mounted on the housing side or on the damper side, and on a radially-extending area of output element 136. An axially effective energy accumulator 138 is provided to space input and output elements 135 and 136 and that simultaneously can generate a frictional torque as a result of relative rotation of the two elements while they are in contact with each other.

Figure 3:
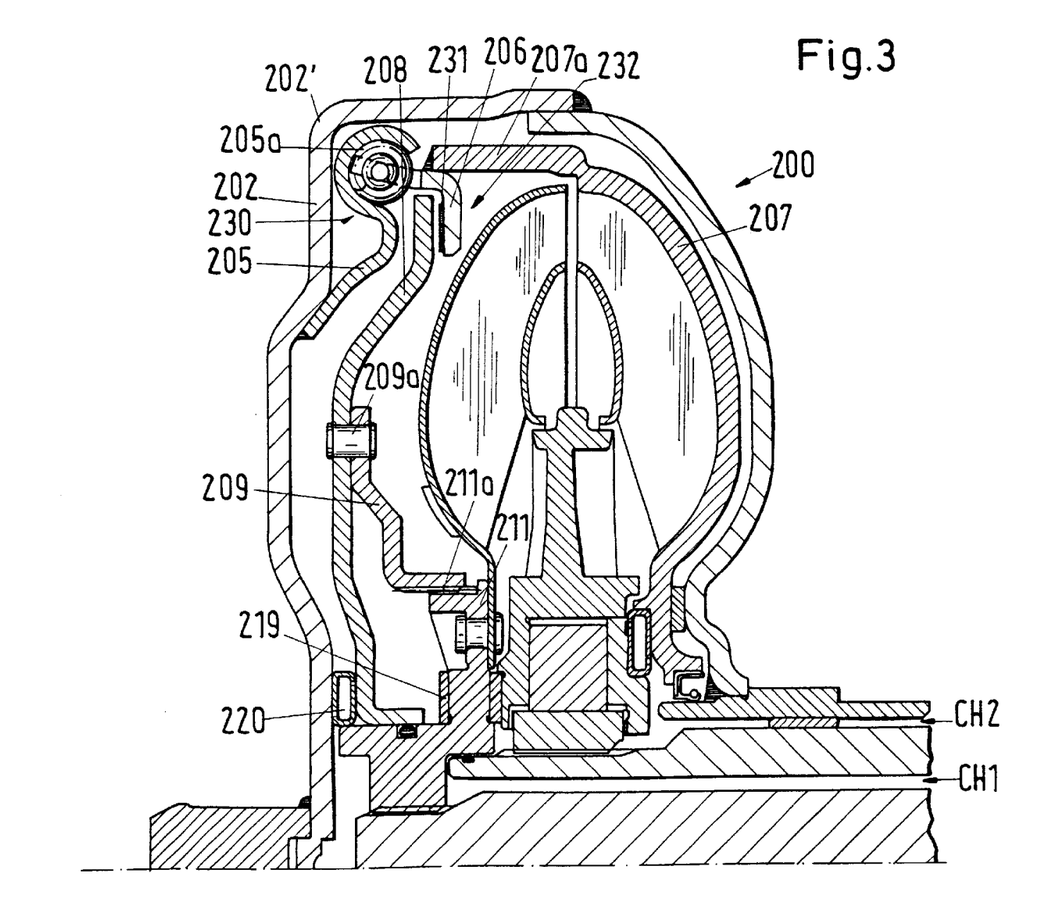
FIG. 3 is a partial sectional view similar to that of FIG. 1 showing another embodiment of the present invention.

FIG. 3 shows an embodiment of an arrangement 200 that is similar to that of arrangement 1' of FIG. 1, but that, in contrast, is different in the region of torsional-vibration damper 230 and of converter lockup clutch 232.

Input element 205 of torsional-vibration damper 230 is firmly secured to shell 202 of housing 202', for example by welding, and it extends radially outwardly of energy accumulator 205a while radially gripping the energy accumulator to define an annular space that is open on one side to receive energy accumulator 205a. On one open side of input element 205, that is peripherally turned back and that engages the energy accumulator, which in this embodiment are arc-shaped springs 205a, the energy accumulator grips a flange element 206. Flange element 206, which in cross section has an L-shape, has a leg as the output element of damper 230 and that connects with energy accumulator 205a at the other circumferential end. The other leg of flange element 206 extends radially inwardly and carries friction lining 231 to frictionally engage the axially displaceable piston 208 of converter lockup clutch 232. Flange segment 206 is securely connected with axially-directed extension 207a of impeller 207, for example by welding.

Piston 208 is rotatably connected with hub flange 211 by means of a flange element 209 that is firmly affixed to piston 208 by circumferentially spaced rivets 209a, whereby the combination of piston 208 and flange element 209 is axially displaceable relative to hub flange 211 by means of teeth 211a. Piston 208 can thereby be moved axially between stops 220 and 219.

Figure 4:
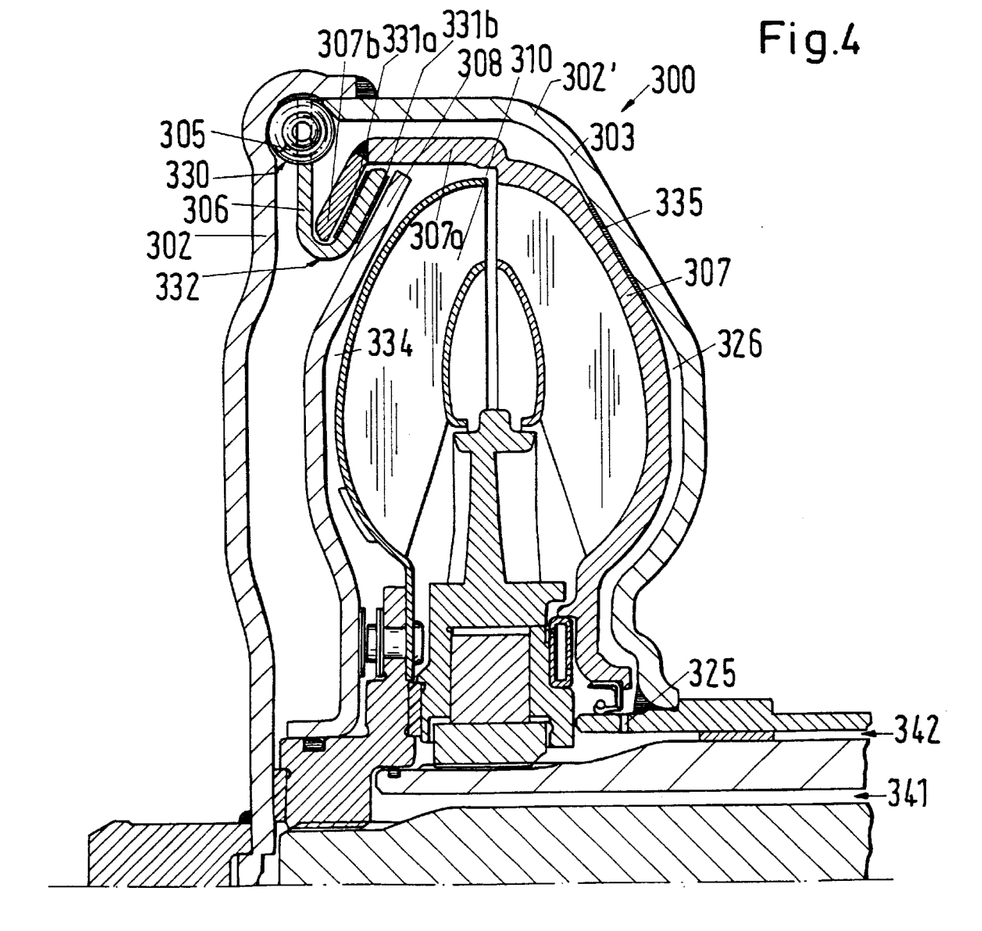
FIG. 4 is a partial sectional view similar to that of FIG. 1 showing a further embodiment of the present invention.

FIG. 4 shows an embodiment of an arrangement 300 that is similar to arrangement 1', but with particular changes in the area of converter lockup clutch 332 and with the ability to completely uncouple impeller 307 from housing 302', while impeller 7 of FIG. 1 is rotatable relative to housing 2' solely in the operating area of damper 30. The uncoupling of housing 302' from impeller 307 results from axially displacing impeller 307 while two conduits 341, 342 are unpressurized, or while both conduits 341, 342 are pressurized. The frictional engagement of friction linings 331a, 331b, 335 is thereby terminated. As a result, frictional contact of housing portion 303 and impeller 307 by means of friction linings 335 provided on the housing or on the impeller will be terminated. Also as a result, any frictional contact at converter lockup clutch 332 is likewise eliminated, and housing 302' can be freely rotated relative to the impeller, making possible, for instance at no load, economically advantageous operation free of drag torque from impeller 307.

Damper 330 corresponds substantially with damper 30 of FIG. 1, with the difference that housing shell 302 is formed radially to optimize the radial positioning of energy accumulator 305. Output element 306 of damper 330 is moved radially inwardly, and its inner periphery is formed to extend radially outwardly in order to form a conical flange element, both sides of which include friction linings 331a, 331b, which on one side allows frictional engagement with axially displaceable piston 308 and on the other side allows frictional locking to an annular flange 307b, which is firmly affixed to axial extension 307a of impeller 307, for example by welding.

In lockup operation, conduit 342, and thereby pressurized chambers 334 and 326, are pressurized through borehole 325, conduit 341 serving as an evacuation conduit. The pressure of the pressure medium forces piston 308 against output element 306, whereby friction linings 331a, 331b are in tight engagement with piston 308 and annular flange 307b, and impeller 307 is axially guided in the direction of housing wall 302, as a result of which the frictional engagement of friction lining 335 between housing 302' and impeller 307 is terminated and damper 330 becomes operative.

During converter operation, conduit 341 is filled with pressure medium and conduit 342 serves as an evacuation conduit. The piston is axially displaced in the direction of turbine 310 and terminates the frictional engagement of friction linings 331a, 331b. At the same time the impeller is displaced axially in the direction of housing shell 303, with which it is then frictionally locked. In this case the torsional vibrations are damped solely by means of the converter medium, because damper 330 is briefly closed. In further embodiments it can be advantageous to improve the damping qualities in the illustrated embodiments of this application to add a so-called turbine damper that operates between the gearbox input shaft and either the turbine or the converter lockup clutch.

Figure 5:
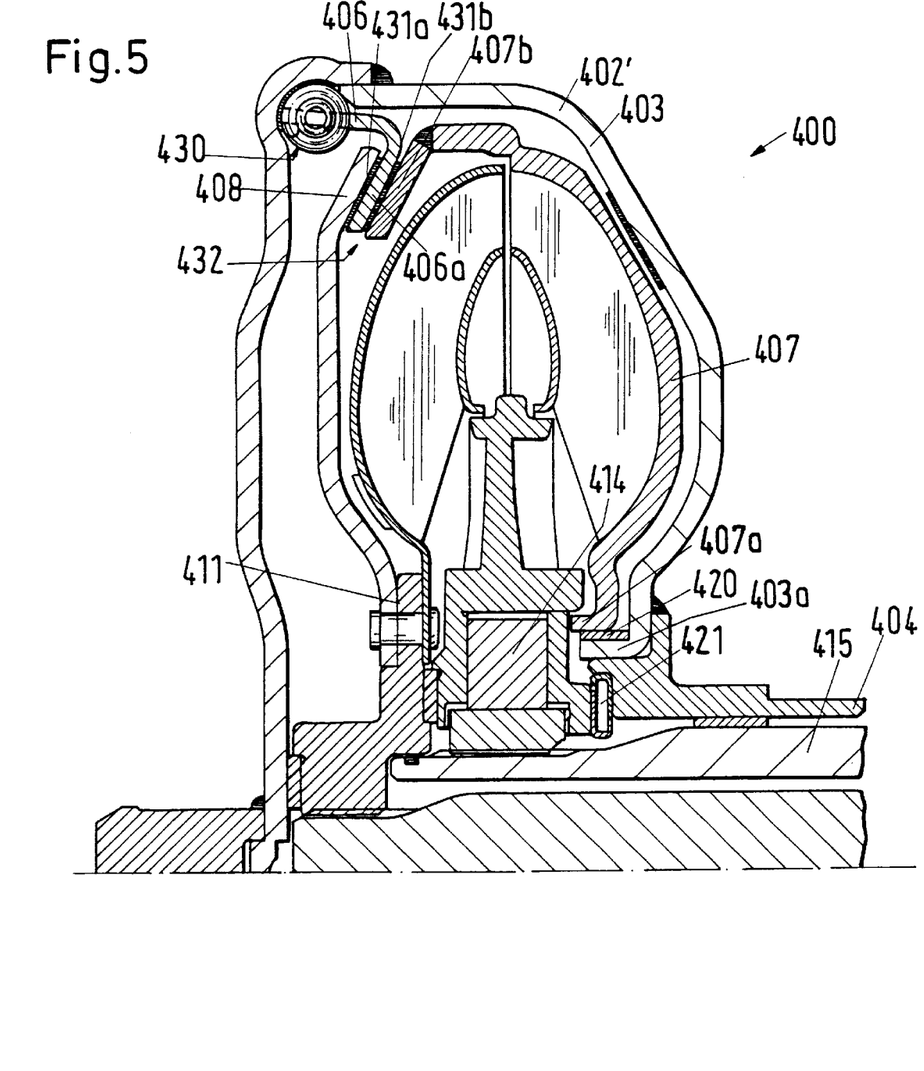
FIG. 5 is a partial sectional view similar to that of FIG. 1 showing a still further embodiment of the present invention.

FIG. 5 shows an arrangement 400 similar to arrangement 300 of FIG. 4, but with a different structure of converter lockup clutch 432 and with a different supporting structure for housing 402' and impeller 407.

In contrast to output element 306 of FIG. 4, output element 406 of damper 430 is spaced axially relative to and after damper 330, as a result of the formation of a flange element to form a conical converter lockup clutch 432, in that output element 406, in contrast to output element 306 of FIG. 4, forms a pressure plate 406 with friction linings 431a, 431b to frictionally engage annular flange 407b and piston 408 in a radial direction from the outside to the inside. Piston 408 is axially resilient and is rotationally locked with hub flange 411.

Housing 402', part of housing shell 403, is rotatably supported on transmission stub 415 by means of hub 404. Housing shell 403 includes an axial extension 403a to center it, and it is securely joined to hub 404, for example by welding. Impeller 407 is supported in an axially displaceable manner at the inside of extension 403a on an intervening slip ring 420, and also includes at the inside periphery an axial attachment 407b. Stator 414 is axially and rotatably offset from hub 404 by bearing 21.

Figure 6:
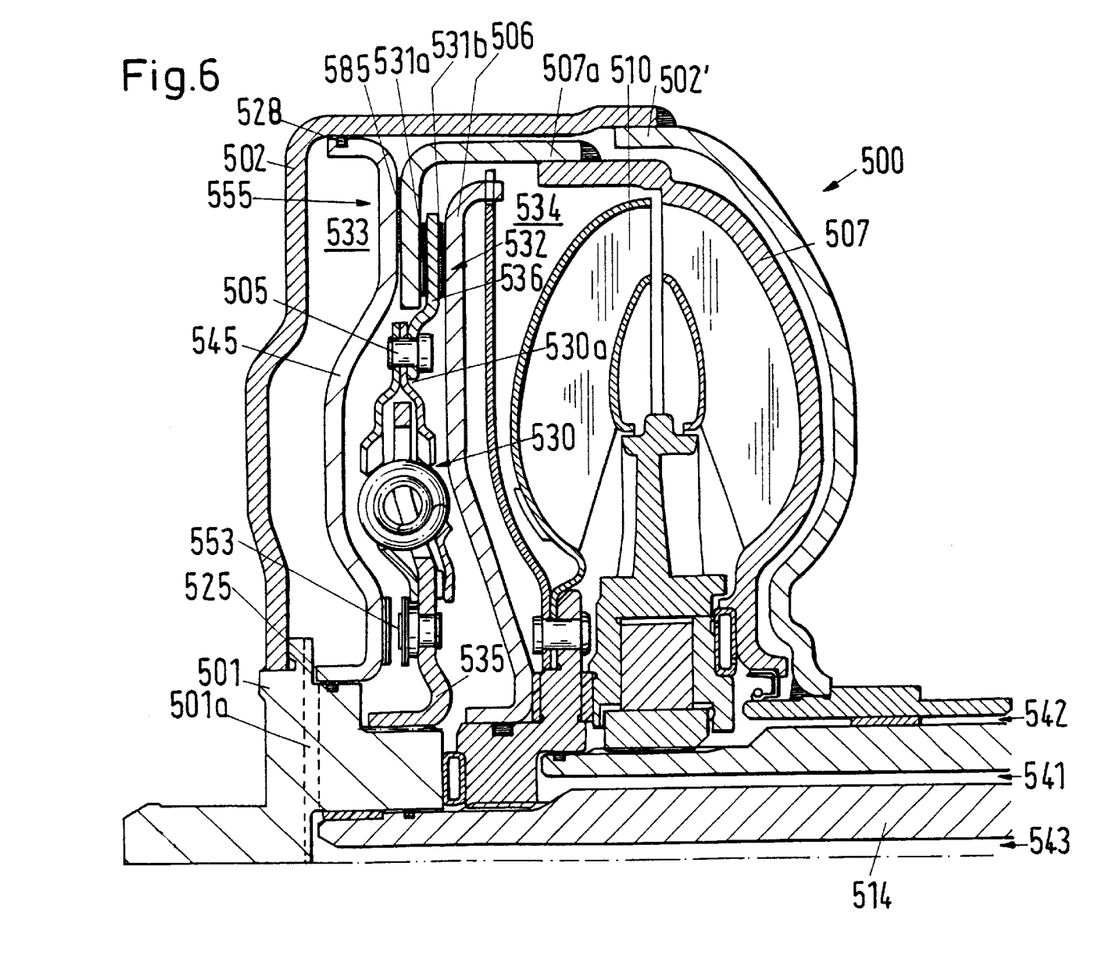
FIG. 6 is a partial sectional view similar to that of FIG. 1 showing another embodiment of the present invention.

FIG. 6 shows an embodiment of a torque transmitting apparatus 500 that functions in a manner similar to that of systems 300, 400 of FIGS. 4 and 5, and shows another arrangement of the pressure conduits and of the converter lockup clutch 532 and clutch 555 to couple impeller 507 with housing 502' in a controlled manner.

The execution of torsional-vibration damper 530 is similar to that of damper 130 of FIG. 2. The execution of converter lockup clutch 532 is identical with that shown in FIG. 2, but with the difference that in the engagement of clutch 555, the changes that follow are advantageous.

Damper 530 is separable from flange element 507a, which is securely connected with impeller 507 and which radially surrounds turbine 510, in connection with which output element 530a of damper 530 includes a radial extension in the form of a flange element 536 that extends radially beyond rivets 505 and that carries friction linings 531a, 531b for frictionally locking with piston 506 and flange element 507a. Positioned axially between housing portion 502 and damper 530 is an axially displaceable piston 545 that radially defines, by means of a radially inner seal 525 and by means of a radially outer seal 528, a chamber 533 that is separate from converter chamber 534, and that by a corresponding axial displacement can frictionally lock housing 502' and impeller 507 by means of friction lining 585. Housing 502' and impeller 507 can thereby be connected and disconnected from each other. As a result, piston 545 is rotatable with input element 535 of damper 530 by circumferentially distributed, torque-transmitting leaf springs 553, and that, in turn, is rotatable with housing 502' through hub 501.

Three operational modes result that can be controlled through pressure conduits 541, 542 and 543. The no-load mode separates housing 502' from impeller 507. In this mode all conduits 541, 542, 543 are either unpressurized or they are identically pressurized, as a result of which no friction torque can be transmitted by friction linings 531a, 531b, 585, and clutch 555 is disengaged.

In the converter mode, a higher pressure is applied in chamber 533, as opposed to that in chamber 534, through the borehole serving as conduit 543 of transmission input shaft 514 and through conduit 501a, so that piston 545 is pressed against flange element 507a and clutch 555 is engaged. Chamber 534 is filled with converter medium through conduits 541 or 542, and the remaining conduit serves as an evacuation conduit. The pressure in chamber 534 is selected to be so low that piston 506 cannot frictionally engage friction linings 531a, 531b.

In the lockup mode, the pressure in chamber 534 is increased so that piston 506 clamps flange element 507a against the damper, by which impeller 507 is thereby bypassed and the torque is transmitted directly to hub flange 511 and hence to transmission input shaft 514. A pressure differential exists between chambers 534 and 533 and serves to keep clutch 555 engaged.

Figure 7:
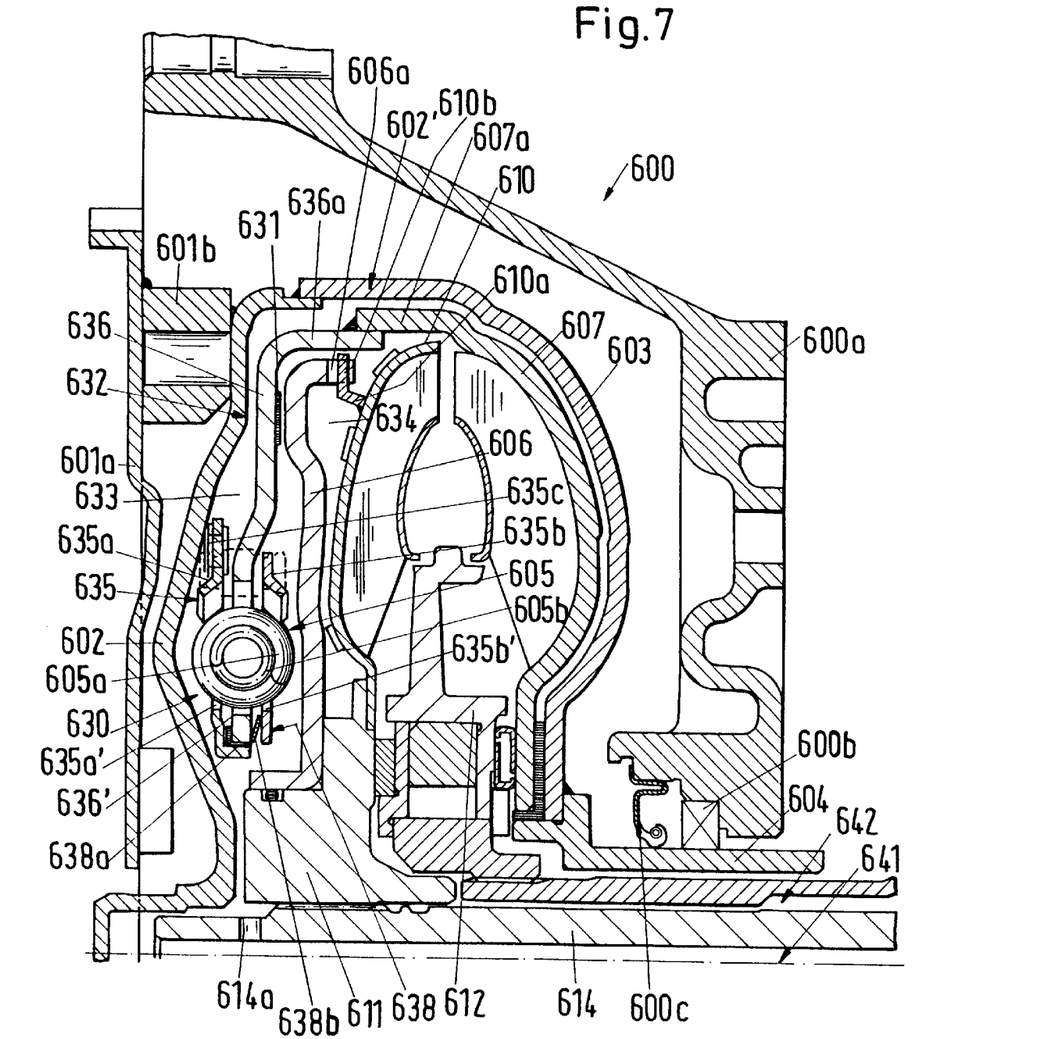
FIG. 7 is a partial sectional view similar to that of FIG. 1 showing a further embodiment of the present invention.

FIG. 7 shows in partial section a further embodiment of a torque converter in accordance with the invention and that is similar to the embodiments shown in FIGS. 1 through 6. To provide an axially flexible and rotationally locked connection between the crankshaft (not shown) and the transmission input shaft, torque converter 600 carries a drive plate 601a that is connected with housing 602' by threaded bolts. Housing 602', formed from housing portions 602 and 603, includes within it stator 612, torsional-vibration damper 630, as well as converter lockup clutch 632, that are non-rotatably connected with input shaft 614 by way of hub 611, as opposed to impeller 607 that is rotatable relative to housing 602'.

Housing 602' is provided on its inner periphery with a tubular, flange-like housing stub 604 that extends in the direction of the transmission and by which housing 602' is rotatably supported relative to transmission housing 600a by a roller bearing 600b or a slide bearing. On the outside, housing stub 604 is sealed off from the bell-shaped coupling by means of a seal 600c between housing stub 604 and transmission housing 600a.

Torsional-vibration damper 630 is operative in the path of power flow between impeller 607 and housing 602' and is securely connected with impeller 607 radially outwardly of turbine 610. By way of example, damper 630 can be welded to output member 636, on the outer periphery of which an axially-formed extension is provided to form the connection with impeller 607. Impeller 607 is likewise axially extended outwardly of and over turbine 610 by way of extension 607a to provide the connection. The two extensions 636a, 607a can be overlap welded or butt welded together, or they can be non-rotatably and axially securely connected together by way of known connection arrangements.

Input element 635 of torsional-vibration damper 630 is formed by two disk elements 635a, 635b that are axially adjacent output element 636 and that are connected together, for example by riveting, in corresponding recessed windows (not shown) of output element 636. The riveted connection can be effected outside or radially inside of energy accumulator 605. Disk element 635a of input element 635 affiliated with housing element 602 is connected with it through a connection such as leaf springs 635c that are connected with disk element 635a and that can be non-rotatably connected to it by riveting. The other ends of leaf springs 635c that are spaced from disk element 635a are securely connected within housing element 602, for example by riveting, and the riveted connection can be formed by way of the rivet pins that extend from housing element 602 and that engage corresponding openings in leaf springs 635c and housing element 602.

Advantageously, leaf springs 635c can be disposed radially between converter lockup clutch 632 and energy accumulator 605, or in special exemplary arrangements radially within energy accumulator 605. In the illustrated embodiment, input element 635 and output element 636 are provided with a frictional arrangement, whereby a disk element, here disk element 635a, is axially reshaped on its outer periphery for radially outwardly receiving and supporting a friction disk 638a, and at the same time parts 635, 636 can serve as a sliding bearing. The two disk elements 635a, 635b are spaced by way of an axially operative energy accumulator 638b. Energy accumulators 605 are equally circumferentially distributed and can be formed from radially interengaged coil springs 605a, 605b that are provided in window-like openings 635a', 635b', 636' in elements 635, 636, so that as a result of relative rotation between input element 635 and output element 636 energy accumulators 605 are arranged circumferentially to enable rotational play and to form a damping device in connection with frictional apparatus 638 for damping torsional vibrations. The maximum angle of relative rotation between output element 636 and input element 635 can be limited by stops or an obstruction (not shown) provided on energy accumulator 605. The enlargement of openings 635a', 635b', 636' in the circumferential direction can set the maximum rotation angle. For optimal utilization of the axial space for structural elements, housing wall 602 opposite from energy accumulator 605 is axially enlarged in the direction of the engine side, that is, in the direction of drive plate 601a.

Provided axially between and opposite input element 635 and turbine 610, and rotatable with, axially displaceable along, and sealingly carried by hub 611 is a piston 606 that includes radially inner and radially outer axial formations, and at its outer end carries an axial profile 606a, for example teeth, that engage with a ring flange 610a securely joined to turbine 610, for example by welding, and that has an outer profile 610b that is complementary with and that engages axial profile 610a. Radially inward of axial profile 606a and across from piston 606 is a frictional surface having a friction lining 631 that is installed on output element 636 of torsional-vibration damper 630, so that by frictional engagement of converter lockup clutch 632 impeller 607 and turbine 610 are locked together. Of course, friction lining 631 could also be provided on piston 606

The operation of converter lockup clutch 632 results from axial displacement of piston 606 by means of the pressure of a pressure medium that is applied to connections 641, 642. If the converter lockup clutch is to be closed, that is, engaged, pressure medium with an increased pressure is pumped into chamber 634 through conduit 642, as a result of which piston 606 is displaced in the direction of friction lining 631 and away from turbine 610, and thereby frictional engagement is provided between output element 636 and housing 602.

Converter lockup clutch 632 is disengaged when an increased pressure is applied to conduit 641 and through opening 614a, whereby pressure medium is pumped into chamber 633, as a consequence of which piston 606 is moved axially toward turbine 610 and thereby the frictional engagement of piston 606 with friction lining 631 is disconnected. The pressure medium will from time to time be carried off from torque converter 600 through unpressurized conduits 641, 642.

Figure 8:
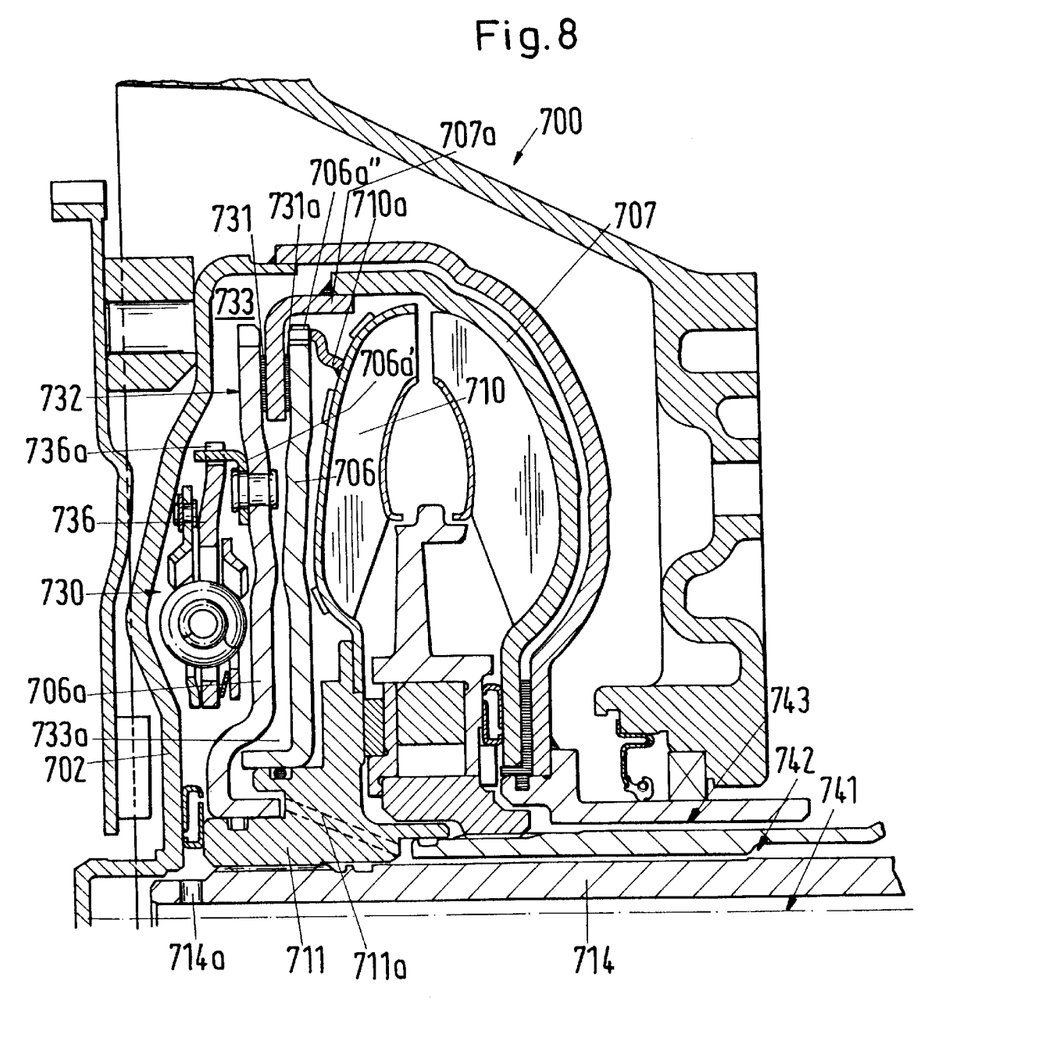
FIG. 8 is a partial sectional view similar to that of FIG. 1 showing a still further embodiment of the present invention.

FIG. 8 shows, in distinction to FIG. 7, a cross section through a torque converter 700 having three pressure medium conduits 741, 742, 743 and a lockup clutch 732 formed with two pistons 706, 706a. Both pistons 706 and 706a are included on and are from time to time axially displaceable along and in sealing engagement with axially formed extensions of hub 711 that have different radii and that are advantageously overlapped, and they form a frictional engagement by means of friction linings 731, 731a with axially directed flange element 707a that is radially outward of piston 706 and that is securely connected with impeller 707, for example by welding, whereby friction linings 731, 731a can be securely attached to flange element 707a or to pistons 706a, 706, respectively.

Damping apparatus 730 is arranged substantially similar to damping apparatus 630 of FIG. 7, whereby output element 736 in this instance is different by way of a peripheral profile 736a, such as peripheral teeth, that forms a locking connection with an axially aligned flange element 706a' that is riveted to piston 706a, and therewith by insertion of torsional-vibration damper apparatus 730 the force from housing element 702 is conducted to piston 706a, and upon latching of the frictional engagement between flange element 707a and piston 706a, to impeller 707.

By way of outer profile 706a", piston 706 forms a locking connection with flange element 710a connected with turbine 710, so that by creating frictional engagement between flange element 707a and piston 706 converter 700 is locked up, that is, the input torque is conducted directly from housing 702 to turbine 710 and from there by way of hub 711 to transmission input shaft 714. In doing so, there is the prerequisite that frictional locking has already been created between piston 706a and flange element 707a.

Embodiment 700 of a torque converter as shown in FIG. 8 offers a way by which torque converter 700 can be uncoupled from housing 702, for example when in neutral. By pressurizing chamber 733 through conduit 741 and opening 714a in transmission input shaft 714, piston 706a is displaced axially in the direction of turbine 710 and provides frictional engagement with flange element 707a, through which housing 702 and impeller 707 are connected, whereby impeller 707 drives turbine 710. In that operation, furthermore, the pressure of the pressure medium applied to chamber 733a through conduit 742 and bore 711a, which is lower than that applied to conduit 741, thereby stops frictional contact between piston 706 and flange element 707a.

To lock converter 700, pressure medium is pumped into conduit 743 to provide frictional engagement between flange element 707a and piston 706, so that piston 706 is displaced axially away from turbine 710, and frictional locking is established between flange element 707a and friction coating 731a, so that torque is conducted from housing 702 and friction coating 731 on flange element 707a, and from there through friction coating 731 a to piston 706, and from there over flange element 706a' on turbine 710 to hub 711, and from there to transmission input shaft 714. Throughout the gear changes both frictional engagements by way of pistons 706 and 706a can by appropriate methods of operation achieve especially economical operation of torque converter 700, for example idling, in pulling operations, and similar conditions.

The claims included in the application are illustrative and are without prejudice to acquiring wider patent protection. The applicant reserves the right to claim additional combinations of features disclosed in the specification and/or drawings.

The references contained in the dependent claims point to further developments of the object of the main claim by means of the features of the particular claim; they are not to be construed as renunciation to independent, objective protection for the combinations of features of the related dependent claims.

Although the subject matter of the dependent claims can constitute separate and independent inventions in the light of the state of the art on the priority date, the applicants reserve the right to make them the subject of independent claims or separate statements. They can, moreover, also embody independent inventions that can be produced from the independent developments of the subject matter of the included dependent claims.

The exemplary embodiments are not to be considered to be limitations of the invention. On the contrary, many changes and variations are possible within the scope of the invention in the existing disclosure, in particular such variants, elements, and combinations and/or materials which, for example, are inventive by combining or modifying single features that are in combination and are described individually in relation to the general specification and embodiments as well as the claims and shown in the drawings, as well as elements or method steps that can be derived by a person skilled in the art in the light of the disclosed solutions of the problem, and which by means of combined features lead to a new object or new method steps or sequences of method steps, as well as manufacturing, testing and operational procedures.

What is claimed is:

1. Torque transmitting apparatus comprising: a fluid coupling having at least one impeller drivingly connected with a drive shaft of a drive unit; at least one turbine drivingly connected with an input shaft of a driven power train; at least one stator mounted between the impeller and the turbine; at least one housing enclosing the impeller and the turbine; and at least one torsional-vibration damper carried within the fluid coupling and operatively positioned between the drive shaft and the input shaft, wherein the at least one torsional-vibration damper is mounted in a path of power flow between the drive shaft and the impeller and is positioned between the housing and the impeller.

2. Torque transmitting apparatus in accordance with claim 1, wherein the impeller is rotatable relative to the housing.

3. Torque transmitting apparatus in accordance with claim 1, wherein the torsional-vibration damper is mounted inside the housing.

4. Torque transmitting apparatus in accordance with claim 1, wherein the torsional-vibration damper includes a plurality of circumferentially disposed energy accumulators that are operative in at least a circumferential direction.

5. Torque transmitting apparatus in accordance with claim 4, wherein the energy accumulators include compression coil springs mounted radially inside the largest axial dimension of the turbine.

6. Torque transmitting apparatus in accordance with claim 4, wherein the energy accumulators include coil springs which are pre-bent to approximate a mounting circumference and which, in their individual length compared with a circumferential mounting radius, extend over an arc of a circle and are positioned radially outward of the turbine.

7. Torque transmitting apparatus in accordance with claim 6, wherein the energy accumulators are positioned directly inside the periphery of the housing.

8. Torque transmitting apparatus comprising: a fluid coupling having at least one impeller drivingly connected with a drive shaft of a drive unit; at least one turbine drivingly connected with an input shaft of a driven power train; at least one stator mounted between the impeller and the turbine; at least one housing enclosing the impeller and the turbine; and at least one torsional-vibration damper carried within the fluid coupling and operatively positioned between the drive shaft and the input shaft, wherein the at least one torsional-vibration damper is mounted in a path of power flow between the drive shaft and the impeller and is positioned axially between the turbine and a housing wall that faces the drive unit.

9. Torque transmitting apparatus comprising: a fluid coupling having at least one impeller drivingly connected with a drive shaft of a drive unit; at least one turbine drivingly connected with an input shaft of a driven power train; at least one stator mounted between the impeller and the turbine; at least one housing enclosing the impeller and the turbine; and at least one torsional-vibration damper carried within the fluid coupling and operatively positioned between the drive shaft and the input shaft, wherein the at least one torsional-vibration damper is mounted in a path of power flow between the drive shaft and the impeller and is positioned adjacent an inner peripheral surface of the housing.

10. Torque transmitting apparatus comprising: a fluid coupling having at least one impeller drivingly connected with a drive shaft of a drive unit; at least one turbine drivingly connected with an input shaft of a driven power train; at least one stator mounted between the impeller and the turbine; at least one housing enclosing the impeller and the turbine; and at least one torsional-vibration damper carried within the fluid coupling and operatively positioned between the drive shaft and the input shaft, wherein the at least one torsional-vibration damper is mounted in a path of power flow between the drive shaft and the impeller and wherein the fluid coupling includes a switchable lockup clutch operatively positioned between the housing and the impeller.

11. Torque transmitting apparatus in accordance with claim 10, wherein the lockup clutch is operatively positioned between an impeller shell and the housing.

12. Torque transmitting apparatus in accordance with claim 10, wherein the lockup clutch includes a piston that is non-rotatably joined with and axially displaceable relative to the housing, and wherein the impeller includes an element that is frictionally engageable with the piston.

13. Torque transmitting apparatus comprising: a fluid coupling having at least one impeller drivingly connected with a drive shaft of a drive unit; at least one turbine drivingly connected with an input shaft of a driven power train; at least one stator mounted between the impeller and the turbine; at least one housing enclosing the impeller and the turbine; and at least one torsional-vibration damper carried within the fluid coupling and operatively positioned between the drive shaft and the input shaft, wherein the at least one torsional-vibration damper is mounted in a path of power flow between the drive shaft and the impeller; wherein the impeller is axially shiftable into and out of frictional contact with the housing; and wherein a switchable converter lockup clutch is operatively positioned between the housing and the input shaft.

14. Torque transmitting apparatus in accordance with claim 13, wherein when the converter lockup clutch is closed, the at least one torsional-vibration damper provides an operative connection between the housing and the input shaft of the driven power train.

15. Torque transmitting apparatus in accordance with claim 13, wherein the torsional-vibration damper includes an output element that includes a flange element that carries a frictional engagement surface for engagement with a piston forming part of the converter lockup clutch.

16. Torque transmitting apparatus in accordance with claim 15, wherein the flange element is conically deformed radially outwardly from an inner circumference to define a conical friction engagement surface.

17. Torque transmitting apparatus in accordance with claim 15, wherein the output element of the torsional-vibration damper is an axial attachment extending from the impeller and is adjacent an outer circumference of the impeller.

18. Torque transmitting apparatus in accordance with claim 17, wherein the axial attachment includes an inwardly-extending annular flange that carries a friction surface for frictional engagement with a piston forming part of the converter lockup clutch.

19. Torque transmitting apparatus in accordance with claim 18, wherein the piston includes a surface to enable frictional engagement of the piston with the annular flange.

20. Torque transmitting apparatus in accordance with claim 18, wherein the annular flange extends radially inwardly to define a conical surface.

21. Torque transmitting apparatus comprising: a fluid coupling having at least one impeller drivingly connected with a drive shaft of a drive unit; at least one turbine drivingly connected with an input shaft of a driven power train; at least one stator mounted between the impeller and the turbine; at least one housing enclosing the impeller and the turbine; and at least one torsional-vibration damper carried within the fluid coupling and operatively positioned between the drive shaft and the input shaft, wherein the at least one torsional-vibration damper is mounted in a path of power flow between the drive shaft and the impeller and wherein an input element of the torsional-vibration damper is directly connected to the housing.

22. Torque transmitting apparatus comprising: a fluid coupling having at least one impeller drivingly connected with a drive shaft of a drive unit; at least one turbine drivingly connected with an input shaft of a driven power train; at least one stator mounted between the impeller and the turbine; at least one housing enclosing the impeller and the turbine; and at least one torsional-vibration damper carried within the fluid coupling and operatively positioned between the drive shaft and the input shaft, wherein the at least one torsional-vibration damper is mounted in a path of power flow between the drive shaft and the impeller and wherein the housing includes a primary inertial mass that is rotatable relative to a secondary inertial mass carried by the impeller to oppose the effect of the torsional-vibration damper.

23. Torque transmitting apparatus in accordance with claim 22, wherein when the converter lockup clutch is closed the secondary inertial mass is supplemented by at least the mass of the turbine.

24. Torque transmitting apparatus comprising: a fluid coupling having at least one impeller drivingly connected with a drive shaft of a drive unit; at least one turbine drivingly connected with an input shaft of a driven power train; at least one stator mounted between the impeller and the turbine; at least one housing enclosing the impeller and the turbine; and at least one torsional-vibration damper carried within the fluid coupling and operatively positioned between the drive shaft and the input shaft, wherein the at least one torsional-vibration damper is mounted in a path of power flow between the drive shaft and the impeller and wherein an input element of the torsional-vibration damper is integral with the housing.

* * * * *